US010384316B2

(12) United States Patent
Goncharov et al.

(10) Patent No.: US 10,384,316 B2
(45) Date of Patent: Aug. 20, 2019

(54) METHOD OF REPAIRING AND MANUFACTURING OF TURBINE ENGINE COMPONENTS AND TURBINE ENGINE COMPONENT REPAIRED OR MANUFACTURED USING THE SAME

(71) Applicant: Liburdi Engineering Limited, Dundas (CA)

(72) Inventors: Alexander B Goncharov, Toronto (CA); Joseph Liburdi, Dundas (CA); Paul Lowden, Cambridge (CA)

(73) Assignee: Liburdi Engineering Limited, Dundas (CA)

( * ) Notice: Subject to any disclaimer, the term of this patent is extended or adjusted under 35 U.S.C. 154(b) by 364 days.

(21) Appl. No.: 14/964,653

(22) Filed: Dec. 10, 2015

(65) Prior Publication Data

US 2017/0100804 A1     Apr. 13, 2017

(30) Foreign Application Priority Data

Oct. 8, 2015     (CN) .......................... 2015 1 0646154

(51) Int. Cl.
*B23P 6/00*     (2006.01)
*C22C 19/05*     (2006.01)
(Continued)

(52) U.S. Cl.
CPC ............. *B23P 6/002* (2013.01); *B23K 9/044* (2013.01); *B23K 9/167* (2013.01); *B23K 9/235* (2013.01);
(Continued)

(58) Field of Classification Search
CPC .... B23K 2201/001; B23P 15/02; B23P 6/002; C22C 19/055; C22C 19/056; C22F 1/10; F01D 5/147; F05D 2230/80
See application file for complete search history.

(56) References Cited

U.S. PATENT DOCUMENTS

| 4,219,592 | A | * | 8/1980 | Anderson | ................ | B23K 9/04 |
|     |     |     |     |     |     | 427/405 |
| 5,897,801 | A | * | 4/1999 | Smashey | ............... | B23K 9/0026 |
|     |     |     |     |     |     | 148/524 |

(Continued)

FOREIGN PATENT DOCUMENTS

GB         1277500 A     6/1972

OTHER PUBLICATIONS

Examination Report dated Mar. 13, 2018 from corresponding Canadian Patent Application No. 2915870.

*Primary Examiner* — Jenny R Wu
(74) *Attorney, Agent, or Firm* — Ridout and Maybee LLP

(57) ABSTRACT

Method of repairing and manufacturing of turbine engine components includes application of a transition layer by fusion welding with dissimilar nickel based filler material, preferably comprising from about 0.05 wt. % to about 1.2 wt. % B and other alloying elements, followed by a diffusion and primary aging heat treatment and application of the top oxidation resistance layer using dissimilar nickel based filler materials comprised 3-6 wt. % Al, 0.5-6 wt. % Si, 12-25 wt. % Cr and other alloying elements that enhance strength and oxidation resistance followed by a secondary aging heat treatment and machining of the repaired area to restore geometry of turbine engine components. The inventions also relates to a turbine engine components repaired and manufactured by the method.

13 Claims, 4 Drawing Sheets

(51) Int. Cl.
    *C22F 1/10*     (2006.01)
    *F01D 5/14*     (2006.01)
    *B23P 15/02*     (2006.01)
    *B23K 9/04*     (2006.01)
    *B23K 9/167*     (2006.01)
    *B23K 9/235*     (2006.01)
    *B23K 10/02*     (2006.01)
    *B23K 15/00*     (2006.01)
    *B23K 26/34*     (2014.01)
    *F01D 5/00*     (2006.01)
    *B23K 101/00*     (2006.01)
    *F01D 5/28*     (2006.01)

(52) U.S. Cl.
    CPC ........ *B23K 10/027* (2013.01); *B23K 15/0033* (2013.01); *B23K 15/0086* (2013.01); *B23K 15/0093* (2013.01); *B23K 26/34* (2013.01); *B23P 6/007* (2013.01); *B23P 15/02* (2013.01); *C22C 19/055* (2013.01); *C22C 19/056* (2013.01); *C22F 1/10* (2013.01); *F01D 5/005* (2013.01); *F01D 5/147* (2013.01); *B23K 2101/001* (2018.08); *F01D 5/28* (2013.01); *F05D 2230/233* (2013.01); *F05D 2230/234* (2013.01); *F05D 2230/80* (2013.01); *F05D 2300/175* (2013.01)

(56) References Cited

U.S. PATENT DOCUMENTS

| | | | |
|---|---|---|---|
| 2005/0126664 A1* | 6/2005 | Peterson, Jr. | B23K 9/00 148/428 |
| 2011/0014271 A1 | 6/2011 | Kawasaki et al. | |
| 2013/0142661 A1* | 6/2013 | Hardy | C22C 19/056 416/241 R |
| 2015/0093284 A1 | 4/2015 | Goncharov et al. | |

* cited by examiner

METHOD OF REPAIRING AND MANUFACTURING OF TURBINE ENGINE COMPONENTS AND TURBINE ENGINE COMPONENT REPAIRED OR MANUFACTURED USING THE SAME

The present application claims priority from regularly filed Chinese utility patent application 201510646154.2, invented by Alexander B. Goncharov, Joseph Liburdi and Paul Lowden and filed Oct. 8, 2015 under the title: Method of Repairing and Manufacturing of Turbine Engine Components and Turbine Engine Component Repaired or Manufactured Using the Same in the name of Liburdi Engineering Limited.

FIELD OF THE INVENTION

The invention relates to fusion welding and can be used for a repair of turbine engine components manufactured of nickel, cobalt and iron based superalloys utilizing gas tungsten arc welding (GTAW), laser beam (LBW), electron beam (EBW), plasma (PAW) and micro plasma (MPW) manual and automatic welding.

BACKGROUND OF THE INVENTION

The present invention is related to a fusion welding and can be used for a repair of various turbine engine components, more particular for repairing and manufacturing of turbine blades manufactured of equiaxed polycrystalline, single crystal and directionally solidified superalloys utilizing cladding and fusion welding processes.

In fusion welding, coalescence or joining between two or more articles takes place by melting of a base material with or without introduction of a filler material, followed by cooling and crystallization of a welding pool. Fusion welding can produce properties equal to those of the base material in wide range of temperatures and conditions. However, accommodation of solidification and residual stresses often results in cracking of difficult to weld Inconel 713, Inconel 738, Rene 77, Rene 80, Rene 142, CMSX-4, Rene N4, Rene N5 and other high gamma prime superalloys that have low ductility and prone to a liquation Heat Affected Zone (HAZ) cracking.

Brazing can produce crack free joints because it does not require melting of a base material to obtain coalescence. Brazing is carried out by melting and solidification of only brazing materials. However, the mechanical properties of brazed joints are usually below the mechanical properties of the base material by 50-75% at high temperature.

The poor mechanical properties of brazed joints produced by most nickel and cobalt brazing materials are related to a high content of boron in these materials and do not allow extensive dimensional restoration of turbine blades and structural repairs of other engine components.

Therefore, despite the propensity for cracking, welding is used more often than brazing for manufacturing and repair of different articles including turbine engine components. However, to avoid cracking during fusion welding turbine blades manufactured of materials having a low ductility are preheated prior to welding to a temperature exceeding 900° C. as per U.S. Pat. No. 5,897,801. Welding is accomplished by striking an arc in the preselected area so as to locally melt the parent material providing a filler metal having the same composition as the nickel-based superalloy of the article, and feeding the filler metal into the arc that results in melting and fusion of the latter with the parent material forming a weld deposit upon solidification.

A similar approach was utilized in the method disclosed in U.S. Pat. No. 6,659,332. The article is repaired by removing of damaged material that is present in the defective area, followed by preheating of the article to a temperature of 60-98% of the solidus temperature of the base material in a chamber containing a protective gas followed by welding.

In order to minimise welding stress in the blade due to the application of considerable thermal energy during fusion welding processes, blades are subjected to controlled heating prior to and controlling cooling after weld repair in accordance with the method described in CA 1207137.

Preheating of turbine blades increases the cost of a repair and does not guaranty crack free welds due to the low ductility of components manufactured of precipitation hardening superalloys.

Therefore, currently only preheating to temperatures exceeding 900° C. allows crack free welding on precipitation hardening equiaxed polycrystalline and directionally solidified high gamma-prime superalloys.

Therefore, one of major objectives of the present invention is the development of a new cost effective method of repairing and manufacturing of engine components by welding and cladding on polycrystalline, directionally solidified and single crystal superalloys at an ambient temperature.

BRIEF DESCRIPTION OF THE INVENTION

We have found that the preferable embodiment of the invented method of repairing and manufacturing of turbine engine components that includes the steps of pre-weld preparation by a removal of a damaged material and contaminants to reveal a defect free base material; weld repair of the damaged area using fusion welding process selected from among laser, micro-plasma, plasma, electron beam and gas tungsten arc welding with preferably two dissimilar filler materials, wherein the first dissimilar filler material, selected from among ductile nickel and cobalt bases alloys comprising high temperature dendrites and low temperature interdendritic eutectics with a solidus temperature below of a solidus temperature of the base material due to of 0.05 wt. %-1.2 wt. % boron additives; followed by a diffusion heat treatment, which is performed after the application of the transition layer, at a temperature exceeding an aging temperature of the base material but below of an incipient melting temperature of the base material from about 30 min to about 24 hours; application of a top oxidation resistance layer using the fusion welding process and second dissimilar filler material comprised from about 5 to 12 wt. % Co, from about 12 to 25 wt. % Cr, from about trace amount to 5 wt. % Mo, from about trace amount to 5 wt. % W, from about 1 to 5 wt. % Ti, from about trace amount to 0.1 wt. % Zr, from about a trance amount to about 1.5 wt. % Hf, from about trace amount to 0.2 wt. % B, from about 3 to 6 wt. % Al, from about 0.5 wt. % to about 6 wt. % Si, from about a trace amount to about 5.5 wt. % Re, from about a trace amount to about 4 wt. % Ta, and nickel with impurities to balance; post weld heat treatment selected from among Hot Isostatic Pressure, annealing, aging and stress relief of the based material followed by the restoration of the original geometry of the engine component by a method selected from among machining, blending, and polishing; non-destructive testing; and dimensional inspection, as well as other embodiments of the current inventions discussed hereafter; produced defect free welds and HAZ on various high gamma prime precipitation hardening nickel based superalloys at an ambient temperature.

In accordance with another embodiment, the filler material for the application of the transition layer to the base materials, which comprises from about trace amount to about 3.5 wt. % aluminum, is selected from the among nickel based alloys comprises from about 0.05 wt. % to about 0.6 wt. % of boron.

In accordance with another embodiment, the filler material for the application of the transition layer to the base materials, which comprises from about 3 wt. % to about 8.0 wt. % aluminum, is selected from the among nickel based alloys comprises from about 0.4 wt. % of boron to about 1.2 wt. % of boron.

Another preferable embodiment includes the additional step of a machining of the transition layer to a uniform thickness of 0.3 mm or greater.

To produce rejuvenation of the base material improving mechanical properties of weld in accordance with another preferable embodiment, the repairing engine component is subjected to a Hot Isostatic Pressure treatment depending on the condition of the base material either prior to the welding or after the application of the transition layer or after the application of the top oxidation resistance layer.

In accordance with another preferable embodiment aiming to improve weldability and perform vacuum cleaning, turbine engine components are subjected to the annealing heat treatment in a vacuum or protective atmosphere, preferably hydrogen, prior to the application of the transition layer.

To simplify using automatic welding and cladding as well as allow direct application of the top oxidation resistance layer to the repair area, the defective material from the tip is removed by a cutback of the blade tip at least of 0.25 mm below of a typical repairable damage of the turbine blades allowing a direct application of the top oxidation resistance layer during following repairs to the previously applied transition layer.

In accordance with preferable embodiments aiming to improve properties of the base and welded material the turbine blade is subjected to a post weld heat treatment selected from among an annealing, precipitation hardening of the base material or both or stress relieve using parameters selected from those among prescribed for the base material.

In accordance with the preferable embodiment of the current invention, the fusion welding process is performed at an ambient temperature.

However, in case of necessity based on weldability of a base material and rejection rate statistic in accordance with another embodiment the fusion welding process can be performed with a preheating to a temperature from about 600° C. to about 1100° C.

Preferable embodiments of the current inventions can be used for repairing and manufacturing of turbine engine components manufactured of single crystal, directionally solidified, equiaxed nickel, cobalt and iron based superalloys.

All preferable embodiments can be used for repairing and manufacturing of turbine engine components selected from among a nozzle guide vanes (NGV), compressor vanes, compressor blades, high pressure compressor (HPC) blades, high presser turbine (HPT) blades, low pressure turbine (LPT) blades, shrouds, seal segments, casings, diaphragms, combustion chambers, combustion liners, fuel nozzles, manifolds of an aero and industrial turbine engines.

The present invention is a further development of repairs of turbine engine components based on using welding materials first described in pending Liburdi Engineering Ltd patent applications WO2015095949, CA2850698 (CN104511702 (A)), PCT/CA2014/000752 and WO2014063222. The combination of boron bearing ductile welding materials for the application of the transition layer followed by the diffusion heat treatment and application of the silicon-bearing top oxidation resistance layer are key steps that produce crack free parts with superior oxidation resistance and differentiate the current invention from previous arts.

The following advantages were observed according to the invention:

This method has been found to produce crack free welds at ambient temperature on most polycrystalline, directionally solidified and single crystal superalloys with a high content of gamma prime phase reducing the cost, increasing productivity and improving the health and safety of working conditions.

The repaired engine component exhibit superior oxidation resistance that exceeds the oxidation resistance of most base materials due to silicon addition and optimization of ratio of Al—Si—Cr.

STANDARD ACRONYMS

Figure 1:
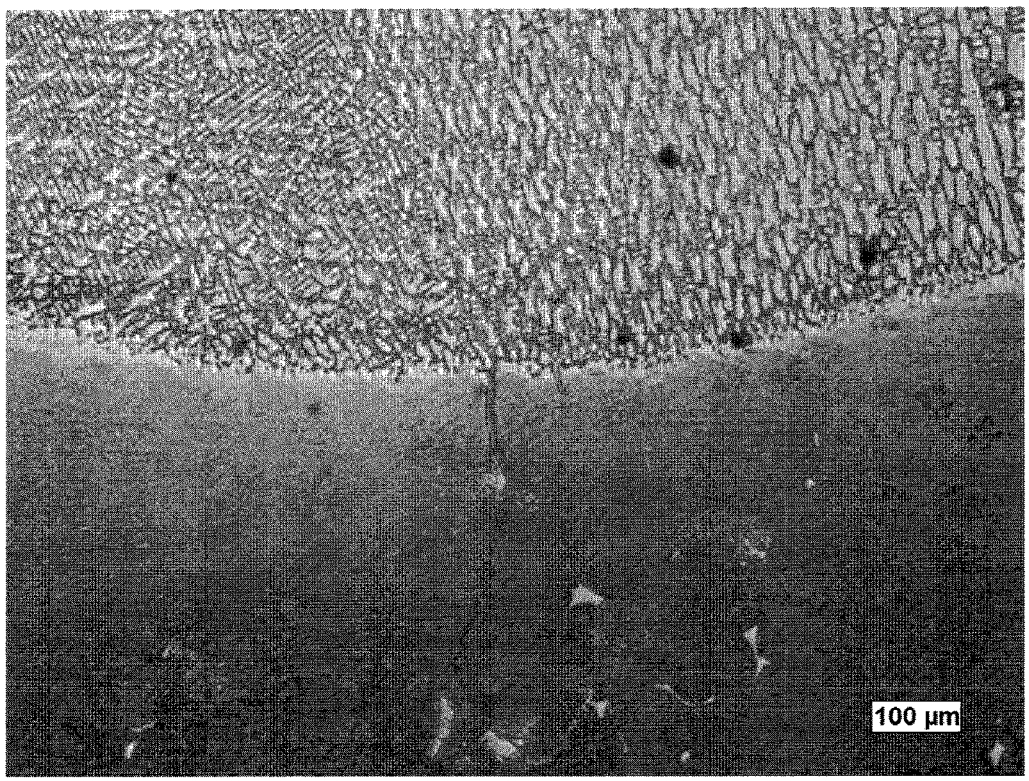
FIG. 1 is the micrographs of the fusion zone of the test sample manufactured of the IN738 with the transition layer produced by the GTAW-MA welding with the first dissimilar filler material Alloy 3669-6B depicting the HAZ liquation cracking healing by low interdendritic eutectics during a solidification of a welding pool.

AMS—Aerospace Material Specification (standards)
ASTM—American Society for Testing and Materials (standards)
AWS—American Welding Society (standards)
OEM—Original Equipment Manufacture
NDT—Non Destructive Testing
PWHT—Post Weld Heat Treatment
HAZ—Heat Affected Zone
IGT—Industrial Turbine Engine
LPT—Low Pressure Turbine
HPT—High Pressure Turbine
HPC—High Pressure Compressor
NGV—Nozzle Guide Vane
GTAW—Gas Tungsten Arc Welding
PAW—Plasma Arc Welding
MPW—Micro Plasma Welding
LBW—Laser Beam Welding
EBW—Electron Beam Welding HIP—Hot Isocratic Pressure
EDM—Electrical Discharge Machining
EM—Engine Manual
SPM—Standard Practice Manual
UTS—Ultimate Tensile Strength
DS—Directionally Solidified (Alloy or Material)
TE—Trailing Edge of Nozzle Guide Vanes and Blades
LE—Leading Edge of Nozzle Guide Vanes and Blades
DTA—Differential Thermal Analysis
EDS—Energy-dispersive X-ray spectroscopy
EPMA—Electron-Probe Micro Analysis Glossary and Terms (Definitions)

Alloys—metal compounds consisting of a mixture of two or more materials. Superalloys—metallic materials with oxidation resistance and mechanical properties for service at elevated temperatures.

Nickel based superalloys—materials whereby the content of nickel exceeds the content of other alloying elements.

Wrought nickel alloys—nickel based alloys that have been bent, hammered, forged or physically formed into a desired shape. Wrought nickel alloys are often welded under the same conditions as certain types of steel.

Cast Nickel Alloys—alloys containing nickel that has been poured or cast as a liquid into a mold and cooled into a solid shape.

Base Metal or Material—one of the two or more metals to be welded together to form a joint.

Cracking—fracture that develops in the weld during or after solidification of a welding pool is completed.

Ductility—ability of metals and alloys to be drawn, stretched, or formed without breaking.

Hardness—ability of metals and alloys to resist indentation, penetration, and scratching.

Heat Treatment—the controlled heating and cooling processes used to change the structure of a material and alter its physical and mechanical properties.

Solution Heat Treatment—the heat treatment method that is used to heat alloys to a specific temperature for a certain period of time allowing one or more alloying elements to dissolve in a solid solution and then cool rapidly.

Aging or Hardening—hardening caused by the precipitation of a constituent from a supersaturated solid solutions.

Aging or Precipitation Hardening Heat Treatment—artificial aging in which a constituent precipitates from a supersaturated solid solution due to heating and exposure to high temperature.

Multi Stage Aging Heat Treatment—process in which the heat treatment temperature is decreased in steps during heat treatment to achieve desirable morphology of precipitancies and properties of superalloys.

Primary aging—the first high temperature stage of the multi stage aging heat treatment.

Secondary aging—the second stage of the multi stage aging heat treatment conduced at a temperature that is lower that a temperature of a primary aging for a selected superalloy.

Hot Isostatic Pressing (HIP)—is the simultaneous application of high temperature and pressure to metals and other materials for a specified amount of time in order to improve their mechanical properties.

Over-ageing—aging under conditions of time and temperature greater than those required to obtain maximum change in certain properties, so that the property is altered in the direction of the initial value, which is applicable particular to changing of properties of turbine engine components exposed to high temperature in service condition of turbine engine components manufactured of precipitation hardening superalloys.

Diffusion heat treatment—heating to spread a constituent, particular boron, in a solid, particular base material, tending to make the composition of all parts, particular weld and base material of an engine component, uniform.

Argon Quench—introducing argon into a vacuum heat treatment chamber at annealing temperature that results in a rapid cooling of alloys to an ambient temperature.

Weldability—ability of a material to be welded under imposed conditions into a specific, suitable structure and to perform satisfactorily for its intended use.

Non-weldable materials—materials that can't be welded using fusion welding processes at an ambient temperature.

Welding Powder—the welding material in a form of powder that is added in making of welded joints or clad welds.

Welding Wire—welding material in a form of wire that is added in making of welded joints or clad welds.

Welding Rods—welding wire cut to a standardized length.

Cladding—the process of the application of a relatively thick layer (>0.5 mm (0.02 in.)) of welding material and/or composite welding powder for the purpose of improved wear and/or corrosion resistance or other properties and/or to restore the part to required dimensions with minimum penetration into the base material.

Weld—a localized coalescence of metal or non-metals produced either by heating the materials to the welding temperature, with or without the application of pressure, or by the application of pressure alone, with or without the use of welding material.

Weld Bead—a weld resulting from a pass.

Heat Affected Zone (HAZ)—the portion of the base metal that has not been melted, but whose mechanical properties or microstructure were altered by the heat of welding.

Dilution—the change in a chemical composition of a welding material caused by the admixture of the base material or previous weld metal in the weld bead that is measured by the percentage of the base metal or previous weld metal in the weld bead.

Welding—the material joining processes used in making welds.

Fusion Welding—the welding process that used fusion of the base metal to make the weld.

Gas Tungsten Arc Welding (GTAW)—in accordance with the AWS definition it is the arc welding process that produces coalescence of metals by heating them with an arc between a tungsten (non-consumable) electrode and the work also know as a base material. Shielding is obtained from a gas or a gas mixture. Pressure may or may not be used and filler metal may or may not be used.

Plasma Arc Welding (PAW)—in accordance with AWS definition it is an arc welding process that produces coalescence of metals by heating them with a constricted arc between an electrode and the workpiece (base metal) known also as transferred arc or the electrode and the constricting nozzle known also as non-transferred arc.

Laser Beam Welding and Cladding (LBW)—in accordance with AWS definition it is a welding process that produces coalescence of materials with the heat obtained from the application of concentrated coherent light beam impinging upon the joint or base material respectively.

Weld Pass—a single progression of a welding or cladding operation along a joint, weld deposit or substrate. The result of a pass is a weld bead, layer or spray deposit.

Multi Pass Cladding and Welding—a weld that is formed by two or more passes

Weld Defects—discontinuities that by nature or accumulated effect render a part or product unable to meet minimum applicable acceptance standards or specifications.

Discontinuity—an interruption of the typical structure of a weld metal, such as a lack of homogeneity in the mechanical, metallurgical or physical characteristics of the base or weld metal.

Linear Discontinuities—weld defects with the ratio of a length to with 3:1 or greater.

Crack—fracture-type discontinuity that is characterized by a sharp tip and high ratio of length to width, usually exceeding three (3).

Solidification Shrinkage—the volume contraction of a metal during solidification.

Fissuring—small crack-like discontinuities with only slight separation (opening displacement) of the fracture surfaces. The prefixes macro—or micro—indicate relative size.

Weld Pool—the localized volume of molten metal in a weld prior to its solidification.

Carbides—compounds composed of carbon and a less electronegative element. Carbon can produce carbides with metals (such as chromium, niobium, molybdenum, tantalum, titanium, tungsten, and other metals of IVB, VB and VIB groups) and non-metal (such as boron, calcium, or silicon). Metal carbides are characterized by their extreme hardness and resistance to high temperatures.

Borides—compounds consisting of two elements of which boron is the more electronegative one. Boron form borides with metal and non-metal elements.

Gamma ($\gamma$) phase—the continuous matrix (called gamma) is a face-centered-cubic (fcc) nickel-based austenitic phase that usually contains a high percentage of solid-solution elements such as Co, Cr, Mo, and W.

Austenite—a solid solution of one or more elements in the face-centered cubic phase.

Gamma Prime ($\gamma'$) phase—the primary strengthening phase in nickel-based superalloys is a compound consisting of nickel and either aluminum or titanium Ni3Al or Ni3Ti that coherently precipitates in the austenitic $\gamma$ matrix.

Ultimate Tensile Strength (UTS)—the resistance of a material to longitudinal stress, measured by the minimum amount of longitudinal stress required to rupture the material.

Yield Strength—the ability of a metal to tolerate gradual progressive force without permanent deformation Creep (properties)—is the tendency of a solid material to move slowly or deform permanently under the influence of stresses. Creep occurs when a metal is subjected to a constant tensile load at an elevated temperature.

Rupture Tests—are tests that are carried out by applying a constant load to a tensile specimen maintained at a constant temperature according to ASTM E139. The rupture test in carried out in a similar manner to the creep test but at a higher stress level until the specimen fails and the time at failure is measured. Time prior to rupture at given loading is used to characterize rupture properties of materials.

Rupture Strength—is a nominal stress developed in a material at rupture, which is not necessarily equal to ultimate strength.

Recrystallization—is a formation of a new, strain-free grain structure from existing one that usually accompanied by grain growth during heating.

Recrystallization temperature—is an approximate temperature at which complete recrystallization of an existing grain structure occurs within a specified time.

Crack free weld—weld beads without linear indications that have the ratio of a length to a width 3:1 or greater found by a non destructive testing or metallographic examination of welds with a magnification up to 100.

Differential thermal analysis (DTA)—is a thermo-analytic technique, similar to differential scanning calorimetry, wherein the sample under the study and an inert reference sample are made to undergo identical thermal cycles, while recording any temperature difference between sample and reference. This differential temperature is then plotted against time, or against temperature (DTA curve, or thermogram). Changes in the sample, either exothermic or endothermic, can be detected relative to the inert reference.

DTA graph—is a curve that provides data on the transformations that have occurred in the sample, such as melting, solidification, phase transformation and sublimation. The area under a DTA peak is the enthalpy change and is not affected by the heat capacity of the sample.

Energy-dispersive X-ray spectroscopy (EDS)—is an analytical technique used for the elemental analysis or chemical characterization of a sample.

Electron Micro Probe Analyzer (EMPA)—is an analytical tool used to non-destructively determine the chemical composition of small volumes of solid materials.

DETAILED DESCRIPTION OF THE INVENTION

HPT and LPT blades and other turbine engine components of aero and IGT engines are manufactured of superalloys, directionally solidified and single crystal materials with a low ductility for ensuring high creep and rupture properties. However, low ductility increases prophecy to cracking of these materials preventing accommodation of residual stresses by a plastic deformation. In addition to above, most equiaxed and directionally solidified superalloys, including most common GTD111 and IN738, are prone to a liquation cracking in the HAZ along the fusion line.

The invented method addressed the cracking problem of the base material enhancing at the same time oxidation resistance of repaired turbine blades by using for the application of transition layer of the first dissimilar boron bearing ductile filler material with a solidus temperature reduced below of the solidus temperature of a base material by boron, preventing overheating of the base material and enabling a self-healing of cracks by redistribution of interdendritic eutectics by capillary forces. The diffusion heat treatment, which is performed after the application of the transition layer, results in a diffusion of boron into the base material along the fusion line increasing thereby crack resistance of the last one. The application of the top oxidation resistance layer using the second dissimilar filler material with silicon additives and optimized ratio of Al—Si—Cr ensure superior oxidation resistance of repaired components. The heat treatment of turbine engine components selected from among HIP, annealing and aging or combination of all above, as well as PWHT restore original properties of the base material.

The invented method is disclosed using by way of the example the repair of turbine blades manufactured of GTD111 equiaxed superalloy followed by examples of repairs of actual engine components manufactured of equiaxed and directionally solidified (DS) GTD111 and IN738 superalloys. These materials were selected for a demonstration due to high sensitivity to overheating, susceptibility to HAZ liquation cracking and wide usage of these superalloys for a manufacturing of HPT blades and NGV of IGT engines.

Prior to the weld repair, turbine blade was subjected to a stripping of the protective coatings and cleaning in accordance within the relevant standard practice.

After cleaning, the turbine blade was subjected to fluorescent-penetrant (FPI) as per AMS2647 and dimensional inspections followed by the tip grinding aiming to remove defective material and reveal defects free base material. For an automatic welding, the defective material was removed uniformly by grinding to the maximum crack depth or below at least of 0.25 mm of a typical crack depth to enable direct weld repair using the second dissimilar filler material during following repairs. For manual welding, it is acceptable to use removal of single cracks by scalping.

Evaluation of the condition of the base material was performed by a stress-rupture testing aiming to optimize repair work scope and sequence of operations. At least one blade of each set was cut to machine stress rupture samples as per ASTM E-8. The stress rupture test of these samples was conducted as per ASTM E-139.

In case of significant deterioration of properties and especially ductility of base materials due to creep and formation of micro voids in engine components exposed to high stresses and temperature, HIP is conducted prior to welding. Turbine blades are heated in an inert gas, usually argon, which applies isostatic pressure uniformly in all directions. This causes the material to become "plastic" allowing voids to collapse under the differential pressure. The surfaces of the voids diffusion bond together to effectively eliminate the defects achieving near theoretical density, while improving mechanical properties of blades. Parameters for HIP treatment are usually specified in various handbooks and relevant OEM specifications and numerous publications. For example, HIP of GTD111 superalloy is performed at a temperature exceeding annealing temperature as per Panyawat Wangyao, Viyaporn Krongtong, Weerasak Homkrajai et al. "OM Study of Effect of HIP and Heat Treatments on Microstructural", Journal of Metals, Materials and Minerals. Vol. 17 No. 1 pp. 87-92, 2007.

Aiming to produce a vacuum cleaning after HIP, the annealing heat treatment of turbine blades manufactured of GTD111 superalloy was conducted at a temperature of 1000° C. for 1 hour. HIP followed by annealing restored ductility of the base material to a level, at which base material was able to withstand thermal stresses induced by welding using the first dissimilar filler material with a reduced solidus temperature and high ductility without cracking.

The application of the transition layer at least is made using a fusion welding process selected from among a laser, micro-plasma, plasma, electron beam and gas tungsten arc welding and the first dissimilar filler material comprising as per the preferable embodiment from about 10 to 25 wt. % Cr, from about trace amount to 10 wt. % Co, from about trace amount to 1.5 wt. % Al, from about trace amount to 20 wt. % Fe, from about trace amount to 1 wt. % Si, from about trace amount to 0.2 wt. % C, from about trace amount to about 3.5 wt. % Ti, from about 0.05 wt. % to about 1.2 wt. % B, at least one elements selected from among niobium, molybdenum and tungsten with a total amount from about 2 wt. % to 25 wt. % and nickel with impurities to balance. The boron content in the first filler material depends on the aluminum content in the base material. GTD111 alloy comprises 3.5 wt. % Al. As it was established by experiments, to exclude the liquation cracking of GTD111 in the HAZ and produce ductile enough welds by manual GTAW welding allowing accommodation of residual stresses by a plastic deformation of a weld metal, the first dissimilar filler material should comprise from about 0.4 wt. % to 1.2 wt. % B and particular 21.5 wt. % Cr—9 wt. % Mo—3.7 wt. % Nb—0.5 wt. % B with nickel and impurities to balance as per PCT/CA2014/000752 further designated as Alloy 3698-6B. Another prominent first dissimilar filler material in a form of the welding wire for manual and automatic GTAW and LBW, is nickel based Alloy 3687B with the chemical composition as per WO2014063222 comprised 0.5 wt. % B, 0.2 wt. % C and other alloying elements.

Aiming to improve weldability of the base material, perform stress relief and minimize boron diffusion from the transition layer into the top oxidation resistance layer, after the application of the transition layer the part is subjected either to the diffusion heat treatment at a temperature exceeding the aging heat treatment temperature of the base material, but below of the incipient melting temperature of the base material or combination of diffusion and primary aging heat treatment. By experiments it was found that sufficient diffusion of boron into base material to a depth of 0.3-1 mm was observed at a temperature of 1205-1220° C. for two hours followed by the primary aging of the blade manufactured of GTD111 similar to IN738 as per Matthew J. Donachie and Stephen J. Donachie, Superalloys, "A Technical Guide", Second Edition, ASM International, 2002, p. 141. After diffusion and primary aging heat treatment, the tip of the blade is machined to produce close to uniform thickens of the transition layer followed by FPI of weld and HAZ. The first filler material comprises of 0.5 wt. % B. Boron is a melting point depressant and due to a solidification of a welding pool results in a formation of a composite-like structure that comprises the high temperature interconnected framework of high temperature dendrites and low temperature interdendritic eutectics.

The solidus temperature of eutectics in Alloy 3669-6B in accordance with DTA was 1201.45° C., which was well below of the solidus temperature of IN738 of about 1284° C., while the solidus temperature of high temperature dendrites comprised about 0.03 wt. % B was 1295.4° C. In accordance with EDS analysis, the content of boron in interdendritic eutectic and borides was about 0.9 wt. % in as welded condition and increased to 9.5 wt. % after diffusion cycle and primary aging.

The solidus temperature of dendrites exceeds even the solidus temperature of the base material, which made welds produced by the first dissimilar filler material extremely stable at a high temperature. Abundance of low temperature eutectics during a solidification of a welding pool allowed self-healing of liquation micro cracks along the fusion line by capillary actions as shown in FIG. 1. Therefore, despite on a high solidus temperature of dendrites forming the weld metal, both weld metal and HAZ of the base material, due to a solidification of welding pool, are free of cracks. Also, as it shown in the Example 1, the material of the transition layer has excellent ductility enhancing the accommodation of solidification and thermal stresses by a plastic deformation within the weld metal.

The primary aging does not reduce ductility of the transition layer due to a negligible content of gamma prime forming elements such as aluminum and titanium in the first dissimilar filler material. The primary aging was made for two hours followed by argon quench to an ambient temperature.

After FPI, turbine blades are undergoing vigorous degreasing in accordance with the relevant standard specification, visual and dimensional inspections.

For the application of the top oxidation resistance layer, the automatic LBW or MPW in a combination with the second dissimilar filler material in a form of a powder is used. GTAW-MA manual welding is more technological and cost effective with the welding wire. Due to difficulties with extrusion of high strength gamma prime superalloys, the filler material in a form of welding powder is much more cost effective in a combination with the laser or microplasma welding.

It was found that to maintain the reasonable cost of the second dissimilar filler material Alloy 3669-B in a form of welding powder and welding wire it should comprise about of 3.5 wt. % Al with the content of other alloying elements about of 14 wt. % Cr, 10 wt. % Co, 3.5 wt. % Mo, 4.5 wt. W, 0.15 wt. % C, 0.02 wt. % B and 1.1 wt. % Si with Ni and impurities to balance as per WO2015095949. The oxidation resistance of welds produced using this filler material at a temperature of 995° C. is 4-5 times better than GTD111 alloy as shown in Example 1. For the automatic LBW or MPB or EBW weld repair better results were produced using the second dissimilar nickel based filler powders with boron content of about 0.1 wt. % and 1.8 wt. % Si further marked as Alloy 3667S, which is preferable option for hot and harsh environment, and filler powder Alloy 3653BS comprising 0.2 wt. % B, 1.2 wt. % Si with nickel and impurities to balance for a repair of structural components such as HPT and LPT NGV assemblies.

After the application of the top oxidation layer using the second dissimilar filler material selected based on service conditions, weldability of a base material and requirements for mechanical and oxidation properties of welds, the turbine engine components are subjected to the secondary aging heat treatment using parameters selected from among parameters prescribed for the base material. The secondary aging heat treatment for GTD111 superalloy is conducted in vacuum or protective atmosphere at a temperature of 845° C. for twenty four (24) hours followed by the argon quench. Aging heat treatment at a temperature of 845° C. does not result in a significant diffusion of boron from the transition layer into the top oxidation resistance layer ensuring superior properties of the exposed to high temperatures blade tip.

After heat treatment, the repaired area is machined to required dimensions using EDM, conventional milling or manual blending followed by a polishing and super finishing of the airfoil.

Dimensional inspection of the turbine blade to the relevant EM standards, as well as FPI in accordance with AMS2647 and radiographic inspection as per ASTM E192-04 or relevant repair specification are used to ensure that all repaired engine components have met specified requirements.

Example 1

The turbine blade was manufactured of the equiaxed GTD111 superalloy, which is extremely prone to the liquation cracking in the HAZ. The concave and convex sides of the airfoil are protected by oxidation resistance coating and can withstand service condition without significant damage to a base material. However, the unprotected tip of the blade exhibits severe oxidation. The turbine blade was repaired as per preferable embodiments of the current invention using manual GTAW-MA with weld current of about 60-80 A and arc voltage of 12-14 V and two dissimilar filler materials. Argon was used for a protection of welding area.

Samples for mechanical testing were produced using the same welding parameters, the first dissimilar ductile filler material Alloy 3698-6B in a form of the welding wire that comprised 0.4 wt. % B and second dissimilar filler material Alloy 3669-S1 in a form of welding wire with oxidation resistance enhanced by the optimization of content of aluminum, chromium and silicon.

Testing of tensile samples manufactured of the base material, transition and top oxidation resistance layers was conducted at 20° C. and 982° C. to assess capabilities of the transition layer to accommodate residual stresses by a plastic deformation during welding and resist nucleation and propagation of thermal fatigue cracks in service conditions. The tensile testing of samples at a room temperature was conducted as per ASTM E-8, and at 982° C.—as per ASTM E-21.

The cyclic oxidation testing was performed using samples of 5 mm in diameter and 25 mm in length extracted from welds. Heating of samples to 995° C. was performed on air, followed by a soaking at this temperature for 50 min, air cooling to below of 400° C. for 500 cycles. Weight of samples was measured before and after testing.

Evaluation of mechanical properties confirmed that the base material can withstand the application of the transition layer by standard GTAW-MA welding at an ambient temperature using the first dissimilar filler material Alloy 3698-6B. Therefore, neither HIP nor annealing heat treatments was required.

The diffusion heat treatment was conducted at an annealing temperature of the base material for two hours followed by argon quench and primary aging in vacuum after the application of the transition layer of about 3 mm in thickness.

After the primary aging, the part was subjected to FPI, machining of the transition layer to a thickness of about 1.6 mm and standard degreasing. The top oxidation resistance layer of about 2.5 mm in thickness was applied using two passes of GTAW-MA welding with the second dissimilar filler material Alloy 3669-S1 in a form of weld wire of 1.14 mm in diameter followed by a secondary aging at a temperature of 845° C. for twenty four hours in vacuum. Welding of the top oxidation resistance layers was also done at an ambient temperature.

The quality of welds was evaluated by NDT that included standard FPI and radiographic inspection. The witness samples and one blade of the set were subjected also to destructive testing by extracting of two samples of about 18-22 mm in length for a metallographic examination from the trailing edge and middle section of the tip. The witness samples passed the metallographic examination. Welds and HAZ were free of cracks and met acceptance standard.

At the final stage of a repair, the turbine blade was subjected to a tip machining and dimensional inspection. Witness samples were subjected to tensile testing to qualify the repair procedure.

As follows from Table 1, transition layer had high ductility at room temperature and superior ductility, significantly exceeding the ductility of the base material, at 982° C. The top oxidation layer had excellent tensile strength and ductility at 20° C. and 982° C., as well as a superior oxidation resistance, exceeding the oxidation resistance of the base material at a temperature of 995° C. as shown in Table 2.

TABLE 1

Mechanical Properties of Transition and Top Oxidation Resistance Layers

| Material | Test Temperature, °C. | Yield Strength, MPa | UTS, MPa | Elongation, % |
|---|---|---|---|---|
| 3698-6B | 20 | 408.86 | 688.1 | 10.6 |
| 3698-6B | 982 | 89.6 | 121.35 | 42.5 |
| 3669-S1 | 20 | 903.9 | 1001.12 | 6.05 |
| 3669-S1 | 982 | 334.05 | 378.18 | 10.9 |
| GTD111 | 20 | 977.5 | 1115.0 | 7.0 |
| GTD111 | 980 | 365.5 | 369.5 | 13.5 |

TABLE 2

Oxidation Resistance of Base Material and Top Oxidation Resistance Layer in Mass Lost after 500 Cycles at a Temperature of 995° C.

| Material | Mass Lost, grams |
|---|---|
| GTD 111 Base Material | 0.213 |
| Weld Metal Produced Using the Second Dissimilar Filler Material Alloy 3669-S1 | 0.058 |

In accordance with NDT welds have met acceptance standards.

Testing of repaired blades in engine conditions demonstrated superior resistance to thermal fatigue cracking of the repair area due to high ductility of the transition layer and high oxidation resistance of the top layer, which was enhanced by the optimization of ratio of Al—Si—Cr elements.

Example 2

Turbine blades of new generation of IGT engine are manufactured of more advanced directionally solidified GTD111 DS superalloy that has better strength in a radial direction and better resistance to axial cracking, which allowed using the first filler material Alloy 3687B as per the preferable embodiment Alloy 3687B comprised 0.5 wt. % B, 0.2 wt. % C and other alloying elements in a form of welding wire for the application of the transition layer by GTAW.

The base material of this set was affected by the extended exposure to service conditions beyond the standard repairable limits. Therefore, to rejuvenate the base material, HIP treatment of blades followed by a vacuum annealing was conducted after the tip preparation just prior to welding. The application of the transition layer was conducted using the first dissimilar filler material Alloy 3687B in a form of a welding wire, GTAW-MA welding and welding parameters described in Example 1. After welding, the transition layer was machined flat for the application of the top oxidation resistance layer by LBW with the second dissimilar filler powder. After the application of the transition layer, diffusion and primary aging heat treatment of blades were performed so as to exclude boron diffusion into the top oxidation resistance layer during the final PWHT.

For the application of the top oxidation resistance layer, the second dissimilar filler material Alloy 3667S in a form of powder was used. Application of the top oxidation resistance layer was made using three (3) passes of LBW welding on Liburdi LAWS 500 system with a welding speed of 1.5 mm/s, laser beam power of 420 W, powder feed rate of 6.5 g/min, laser beam oscillation speed of 20 mm/s and argon protection. Witness test samples for mechanical testing were produced using the same welding and heat treatment parameters and filler materials. Weld repair was performed at an ambient temperature.

After the application of the top oxidation resistance layer, blades and witness samples were subjected to the secondary aging heat treatment at a temperature of 845° C. for twenty four (24) hours followed by a restoration of the blade tip by machining, EDM and blending.

The final FPI, radiographic and dimensional inspection were conducted to verify compliances of repaired blades to the relevant specification. Witness test samples were subjected to tensile testing at 20° C. and 982° C. The accelerated cyclic oxidation test was conducted by heating of samples extracted of the weld metal of 5 mm in diameter and 25 mm in length to a temperature of 1120° C., soaking at this temperature of 60 min followed by air cooling below of 400° C. The oxidation resistance of samples was compared to oxidation resistance of turbine blades of Advanced Aero Turbine Engine Material (AATEM) that has more superior oxidation resistance than CDT111 DS.

Figure 2:
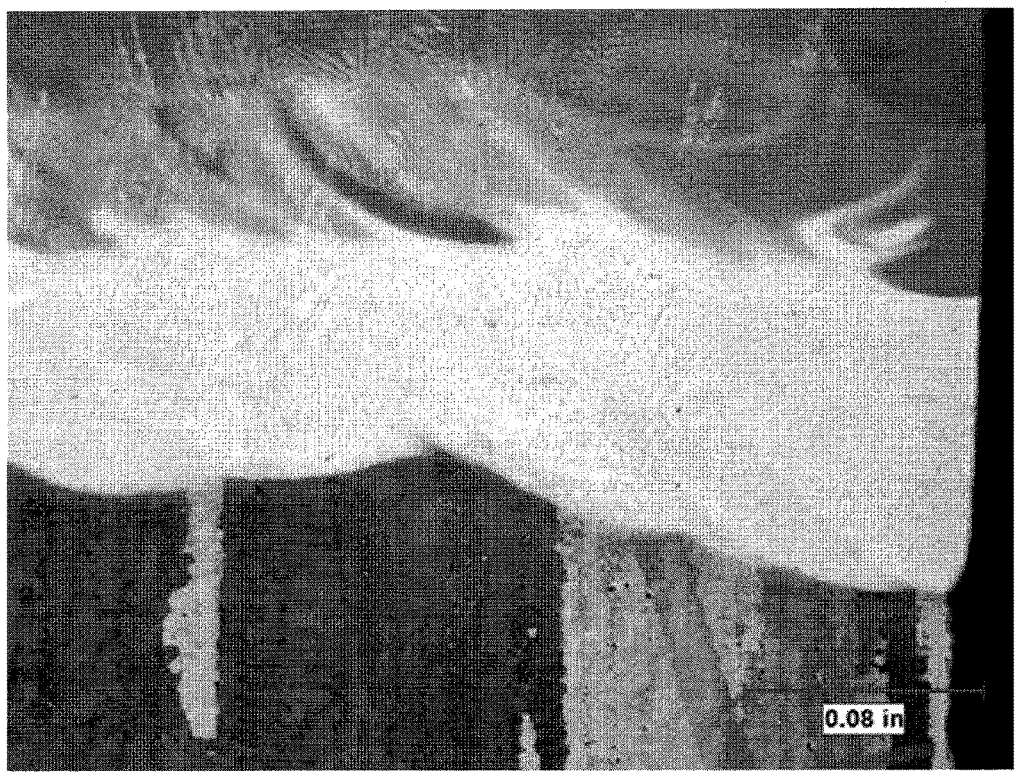
FIG. 2 depicts the microstructure of the crack free Heat Affected Zone of the trailing edge of IGT blade manufactured on GTD 111 DS superalloy, transition layer produced using GTAW-MA welding with the first dissimilar filler material Alloy 3687B adjacent to the base material and top oxidation resistance layer produced by the second dissimilar filler material Alloy 3667S.
Figure 3:
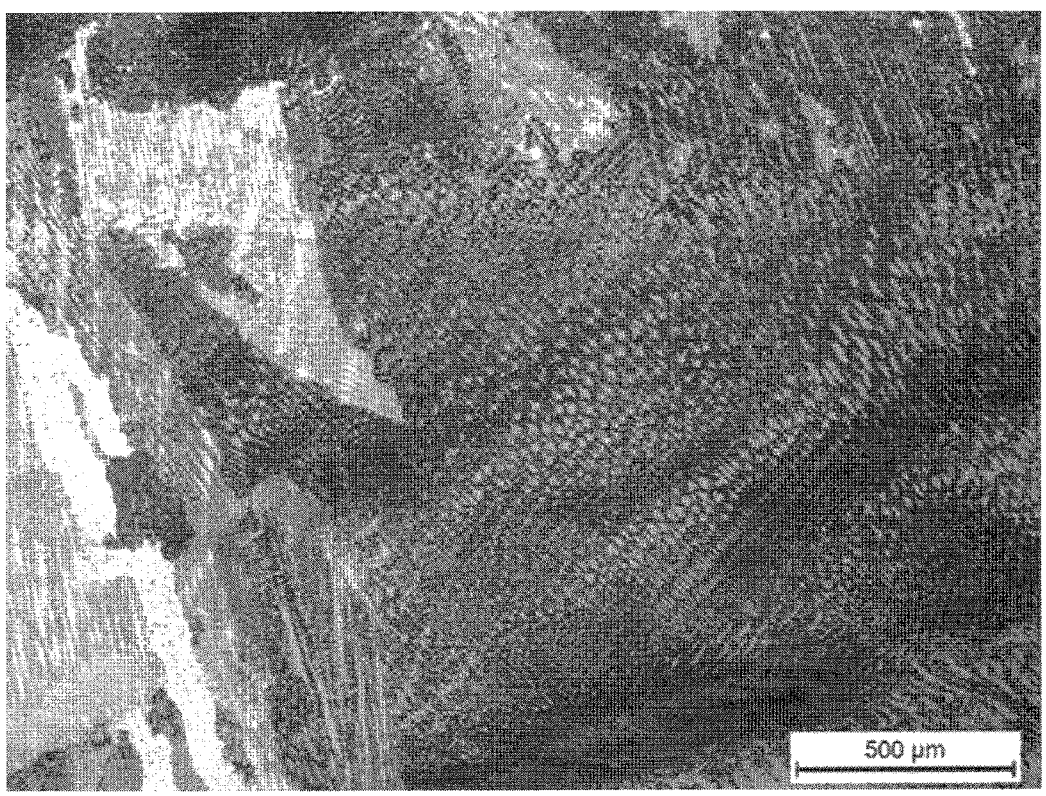
FIG. 3 depicts the defect free microstructure of the top oxidation resistance layer produced using the second dissimilar filler material Alloy 3667S at magnification of ×500.

One randomly selected blade was subjected also to a destructive testing. The longitudinal sample was extracted from the trailing edge. The transverse sample was extracted from the leading edge. Both samples were polished to a roughness of 0.5 μm and etched using standard etchant Marble's. The structure of the defect free weld and base material depicting DS structure of the base materials, transition and top oxidation resistance layer is shown in FIG. 2. The microstructure the defect free top oxidation layer with higher magnification is shown in FIG. 3.

TABLE 3

Mechanical Properties of Transition and Top Oxidation Resistance Layers

| Material | Test Temperature, °C. | UTS, MPa | Yield Strength, MPa | Elongation, % |
|---|---|---|---|---|
| 3687B | 70 | 81.3 | 58.2 | 4.7 |
| 3687B | 982 | 31.1 | 20.4 | 19.9 |
| 3667S | 982 | 39.8 | 37.3 | 10.8 |

TABLE 4

Oxidation Resistance of AATEM and Top Oxidation Resistance Layer in Mass Lost after 100 Cycles at a temperature of 1120° C.

| Material | Mass Lost, grams |
|---|---|
| AATEM | −0.0376 |
| 3667S | −0.0002 |

Example 3

The repair of NGV manufactured of IN738 that is difficult to weld was conducted to demonstrate applicability of the invented method for a restoration of airfoils of non-rotating components. In service conditions NGV exhibited cracking and significant thinning of the trailing edge (TE) due to erosion and thermal cycling.

Prior to a repair, aluminizing coating was stripped from NGV followed by chemical cleaning and FPI inspection. Cracks and defective materials were removed by scalloping of the trailing edge (TE) followed by FPI to verify crack removal.

To improve weldability of the base material and clean the part prior to welding, the NGV was subjected to a vacuum annealing as for IN738.

Taking into consideration a small nominal thickness of the trailing edge (TE), the transition layer was produced using the first dissimilar filler material 3698-6B followed by the application of high strength and good oxidation resistance layer using the second dissimilar filler material Alloy 3653BS comprised as per the preferable embodiment just about of 0.2 wt. % B and 1.2 wt. % Si. Due to the elevated content of boron in the top oxidation resistance layer and application of the protective aluminizing coating to the NGV including TE, the diffusion heat treatment was combined with a post weld annealing, primary and secondary aging into one cycle aiming to reduce the cost and increase productivity.

The combined into one cycle diffusion, annealing and primary aging heat treatment was performed in vacuum using standard heat treatment cycle as for IN738. Application of the protective aluminizing coating was made using standard aluminum based paint in accordance with the relevant Engine Manual procedure during the secondary aging at a temperature of 845° C. for 24 hours. During this heat treatment aluminum diffused into base material producing aluminizing coating that protected base material and repair area from oxidation in service conditions.

Figure 4:
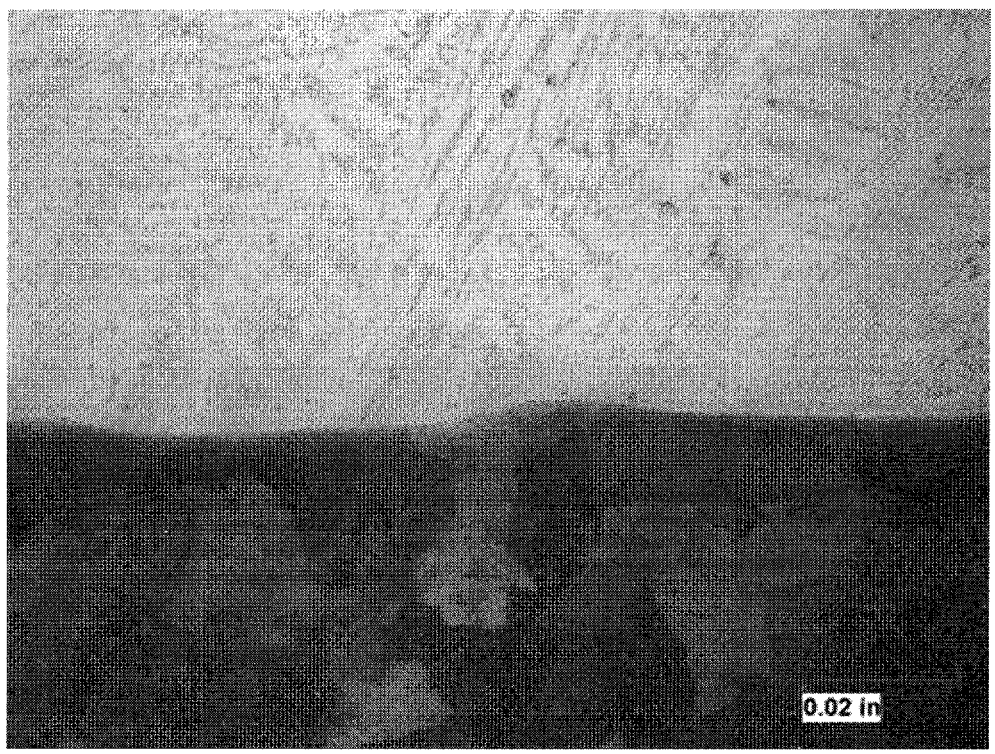
FIG. 4 is the micrograph of the cracks free HAZ and transition layer produced using GTAW-MA and first dissimilar filler material Alloy 3669-6B.

After repair, the NGV was subjected to standard FPI and dimensional inspections to relevant repair standards. In addition to above, samples for a metallographic evaluation were extracted from the repair areas. The metallographic examination confirmed results of FPI. No cracks were found in weld and HAZ. The micrograph depicting the fusion line, base material and weld is shown in FIG. 4.

Cracking of the HAZ and welds was eliminated due to reducing the solidus temperature of interdendritic eutectics that were formed in welds during a solidification of a welding pool below of a solidus temperature of IN738, 1201.45° C. and 1284.53° C. respectively, allowing self-healing of liquation crack along the fusion zone shown in FIG. 1. Accommodation of residual stresses with the transition layer having superior ductility in a comparison with high gamma prime IN738 excluded stress-strain cracking. Superior oxidation resistance was achieved by optimization of alloying elements in the top oxidation resistance layer. The combined using of the first and the second dissimilar filler materials allowed welding at an ambient temperature, which distinguish the preferable embodiment from the previous arts, simplified technology and reduced the repair cost.

We claim:

1. Method of repairing and manufacturing of turbine engine components manufactured of high gamma prime superalloys includes the steps of:
   a) pre-weld preparation of a base material by removal of a damaged material and contaminants to reveal a defect and contamination free base material;
   b) an application of a transition layer of at least 0.3 mm in thickness to the defect and contamination free base material using a fusion welding process and a first dissimilar filler material comprising:
      i) Chromium from about 10 to 25 wt. %
      ii) Cobalt from trace amount to 10 wt. %
      iii) Aluminum from trace amount to 1.5 wt. %
      iv) Iron from trace amount to 20 wt. %
      v) Silicon from trace amount to 1 wt. %
      vi) Carbon from trace amount to 0.2 wt. %
      vii) Titanium from trace amount to about 3.5 wt. %
      viii) Boron from 0.4 to 0.6 wt. %
      ix) At least one element selected from among niobium, molybdenum and tungsten with a total amount from about 2 wt. % to 25 wt. %
      x) Nickel with impurities for balance
   c) a diffusion heat treatment, which is performed, after the application of the transition layer prior to step (d), at a temperature that exceeds the primary aging temperature but below of an incipient melting temperature of the base material from about thirty minutes to twenty four hours;
   d) an application of a top oxidation resistance layer onto the transition layer using the fusion welding process and a second dissimilar filler material comprising:
      i) Cobalt from 5 to 15 wt. %
      ii) Chromium from 12 to 25 wt. %
      iii) Molybdenum from trace amount to 5 wt. %
      iv) Tungsten from trace amount to 10 wt. %
      v) Titanium from trace amount to 5 wt. %
      vi) Zirconium from trace amount to 0.1 wt. %
      vii) Hafnium from trace amount to about 1.8 wt. %
      viii) Boron from trace amount to 0.2 wt. %
      ix) Aluminum from 3 to 6 wt. %
      x) Silicon from 1 wt. % to 6 wt. %
      xi) Rhenium from trace amount to 5.5 wt. %
      xii) Tantalum from trace amount to 8 wt. %
      xiii) Iron from trace amount to 1 wt. %
      xiv) Carbon from trace amount to 0.2 wt. %,
      xv) Nickel with impurities to balance
   e) a post weld heat treatment selected from among an annealing, primary and secondary aging and stress relief of the base material or the combination of above; and
   f) a restoration of a geometry of the repaired area.

2. Method of repairing and manufacturing of turbine engine components manufactured of high gamma prime superalloys according to claim 1, wherein the damaged materials from the turbine engine component is removed below at least 0.25 mm of a typical crack depth, allowing a direct application of the second dissimilar filler material following application of the first dissimilar filler material to form the transition layer.

3. Method of repairing and manufacturing of turbine engine components manufactured of high gamma prime superalloys according to claim 1, wherein the method includes the additional step of a machining of the transition layer.

4. Method of repairing and manufacturing of turbine engine components manufactured of high gamma prime superalloys according to claim 1 wherein the method includes the additional step of a Hot Isostatic Pressure treatment prior to the application of the transition layer.

5. Method of repairing and manufacturing of turbine engine components manufactured of high gamma prime superalloys according to claim 1 wherein the method includes the additional step of the Hot Isostatic Pressure treatment after the application of the transition layer.

6. Method of repairing and manufacturing of turbine engine components manufactured of high gamma prime superalloys according to claim 1, wherein the method includes the additional step of the Hot Isostatic Pressure treatment using parameters selected from among prescribed for the base material after the application of the top oxidation resistance layer but before the aging heat treatment.

7. Method of repairing and manufacturing of turbine engine components manufactured of high gamma prime superalloys according to claim 4 comprises the addition step of an annealing heat treatment in a vacuum or protective atmosphere, preferably hydrogen, after the hot Isostatic Pressure treatment but prior to the application of the transition layer.

8. Method of repairing and manufacturing of turbine engine components manufactured of high gamma prime superalloys according to claim 1, wherein the fusion welding process is performed at an ambient temperature.

9. Method of repairing and manufacturing of turbine engine components manufactured of high gamma prime superalloys according to claim 1, wherein the fusion welding process is performed with a preheating of the turbine engine components to a temperature from about 600° C. to 1100° C.

10. Method of repairing and manufacturing of turbine engine components manufactured of high gamma prime superalloys according to claim 1, wherein the turbine engine components are selected from among a nozzle guide vanes, compressor vanes, compressor blades, high pressure compressor blades, high pressure turbine blades, intermediate pressure turbine blades, low pressure turbine blades, shrouds, seal segments, casings, diaphragms, combustion chambers, combustion liners, fuel nozzles, manifolds of an aero and industrial turbine engines.

11. Method of repairing and manufacturing of turbine engine components manufactured of high gamma prime superalloys according to claim 1, wherein the fusion welding process is selected from among laser welding, gas tungsten arc welding, plasma welding, microplasma welding and electron beam welding.

12. Method of repairing and manufacturing of turbine engine components manufactured of high gamma prime superalloys according to claim 1, wherein the step e) is performed by using a method selected from among a machining, blending, and polishing.

13. Method of repairing and manufacturing of turbine engine components manufactured of high gamma prime superalloys according to claim 1, wherein the method comprises a step of a non-destructive testing and a step of a dimensional inspection.

* * * * *